July 26, 1938.   T. R. HARRISON ET AL   2,124,946
PNEUMATIC CONTROL APPARATUS
Filed Oct. 12, 1933   3 Sheets-Sheet 1
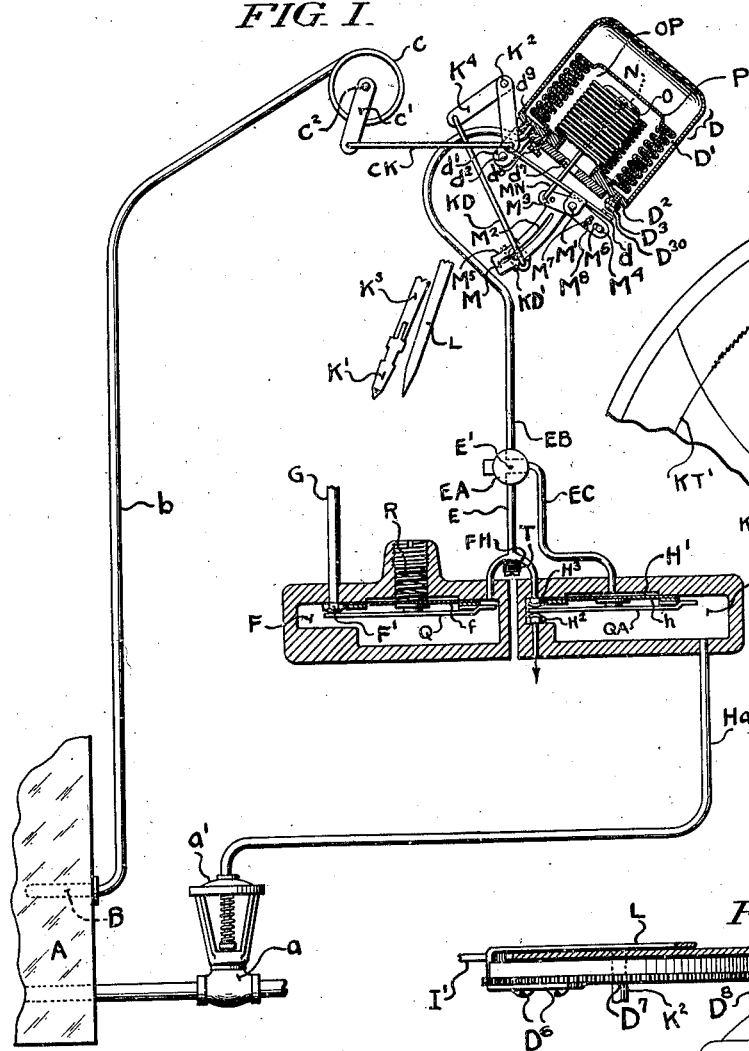
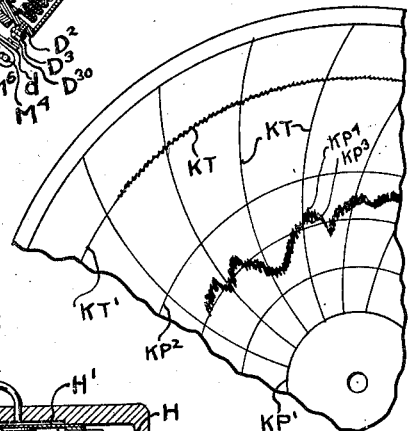
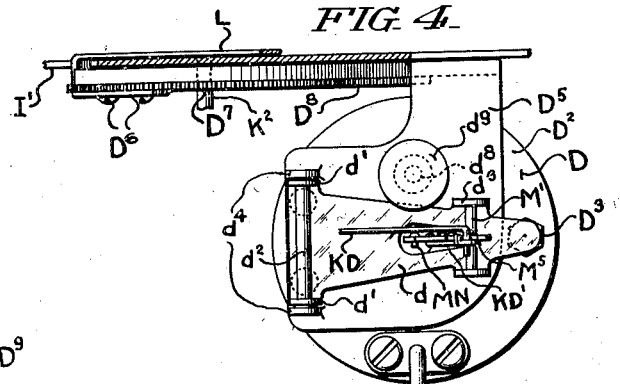
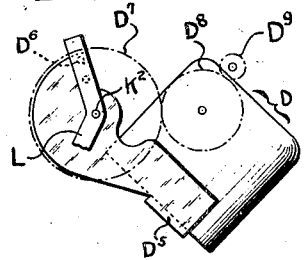
INVENTORS.
Thomas R. Harrison,
Frederick W. Side,
BY John E. Hubbell
ATTORNEY.

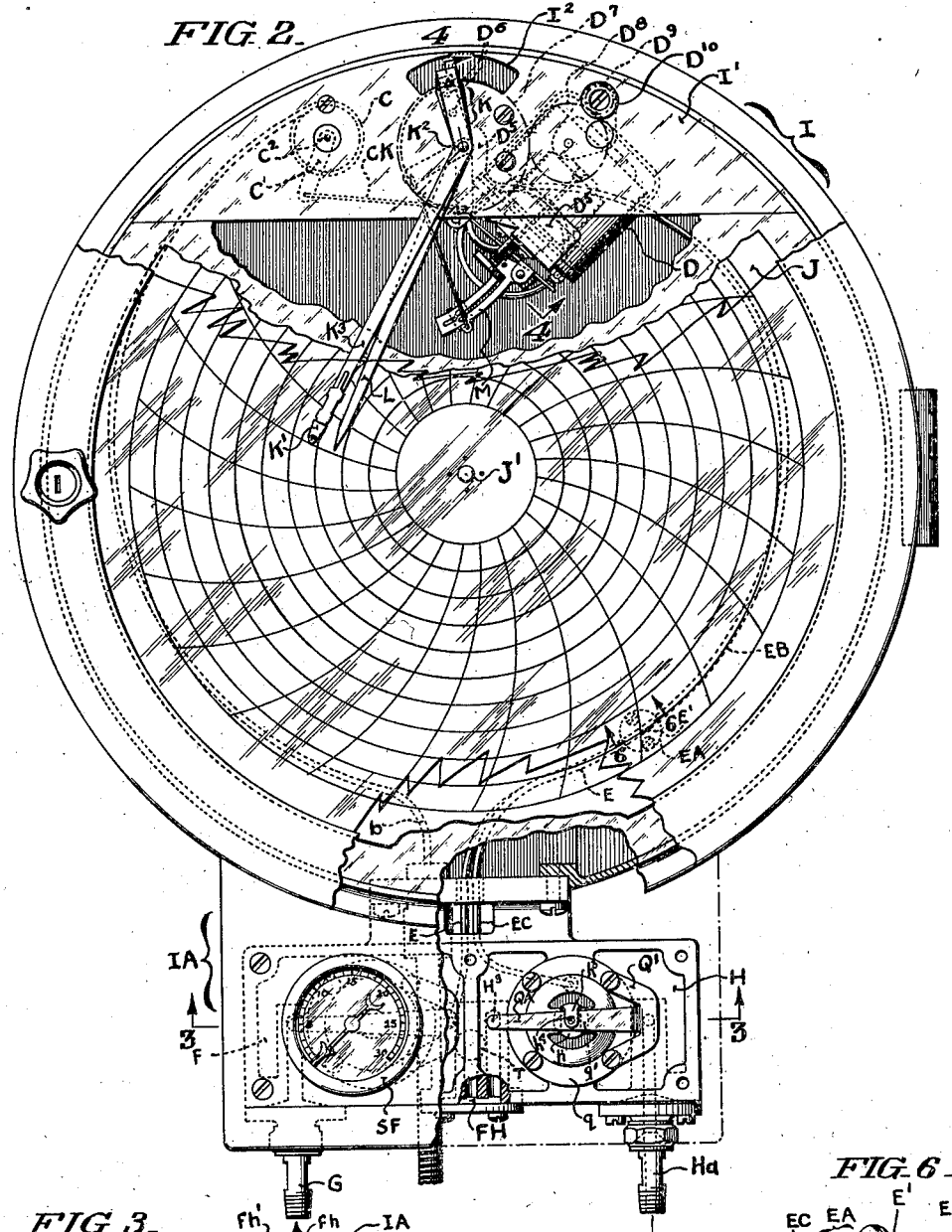

INVENTORS.
Thomas R. Harrison,
Frederick W. Side
BY John E. Hubbell
ATTORNEYS.

Patented July 26, 1938

2,124,946

UNITED STATES PATENT OFFICE 2,124,946

PNEUMATIC CONTROL APPARATUS

Thomas R. Harrison, Wyncote, and Frederick W. Side, Philadelphia, Pa., assignors to The Brown Instrument Company, Philadelphia, Pa., a corporation of Pennsylvania Application October 12, 1933, Serial No. 693,388
Renewed October 2, 1936

30 Claims. (Cl. 236—82)

The general object of the present invention is to provide improved control apparatus of the type comprising what may be called an air controller, by means of which variations in a measurable controlling condition produce predetermined changes in a pressure fluid, ordinarily air under pressure, which thus forms a control force, which in magnitude is a definite function of the controlling condition, and which may be employed directly, or more usually through a relay mechanism, to vary some controlled condition, which may or may not react upon the controlling condition. Such control apparatus has a wide range of use, as the controlling condition may be any condition, such as temperature, pressure or velocity, for example, constituting or creating a measurable force or action.

More specific objects of the present invention are to provide improvements in the mechanism by which the fluid pressure control force is regulated or varied in accordance with variations in the controlling condition, those improvements being partly mechanical and of especial importance from the standpoint of mechanical simplicity and effectiveness, but also including novel provisions contributing to a sensitive or quickly responsive regulatory action, and to a reduction in the hunting tendency which sensitive regulatory action ordinarily tends to produce.

A further specific object of the invention is the combination of the essential control elements in a simple, compact and effective control instrument or meter, which, preferably, in large part is similar to, and consists of standard parts of, an existing commercial type of meter, used for measuring and recording temperatures, pressures, etc.

The various features of novelty which characterize our invention are pointed out with particularity in the claims annexed to and forming a part of this specification. For a better understanding of the invention, however, and the advantages possessed by it, reference should be had to the accompanying drawings and descriptive matter in which we have illustrated and described a preferred embodiment of the invention.

Of the drawings:

Fig. 1 is a diagrammatic representation of a control system embodying the present invention;

Fig. 2 is an elevation with parts broken away and in section of a control instrument including control provisions shown diagrammatically in Fig. 1, and also including provisions for recording the value of the controlling condition;

Fig. 3 is an inverted plan in section on the line 3—3 of Fig. 2;

Fig. 4 is an elevation of a portion of the instrument of Fig. 2, on the plane 4—4 of that figure;

Fig. 5 is a partial elevation with parts broken away illustrating certain adjustment details; and Fig. 6 is a partial section on the line 6—6 of Fig. 2;

Fig. 6 is an elevation, partly in section, illustrating a portion of the air piping shown in Fig. 2;

Fig. 10 is a portion of a chart showing performance curves obtainable with the apparatus disclosed.

Figure 7:
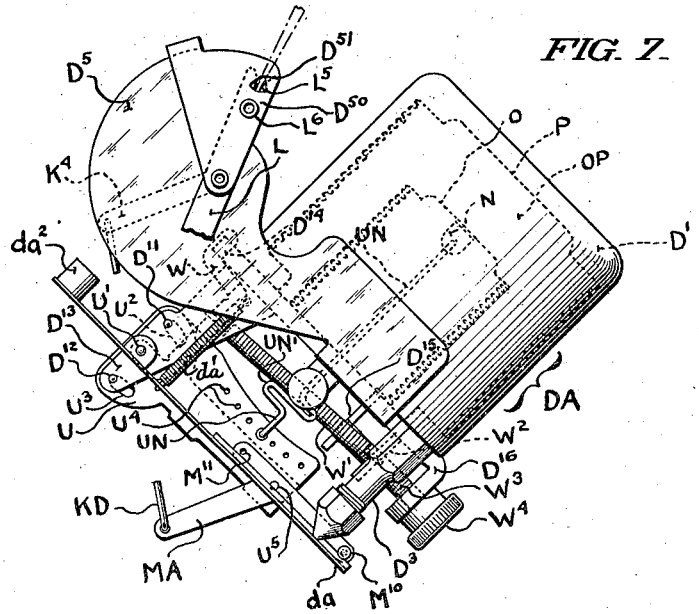
Fig. 7 is an elevation of a modified form of air controller unit.

The particular form of control system diagrammatically shown by way of example in Fig. 1, is adapted to adjust a fuel supply valve or other controller $a$, to thereby regulate the supply of heat to a furnace A as required to maintain an approximately constant furnace temperature which is measured by an expansion fluid thermometer of which B is the temperature responsive bulb or chamber. The fluid pressure in chamber B, which increases and decreases as the furnace temperature rises and falls, is transmitted by a conduit $b$ to a pressure responsive element C, shown as a Bourdon tube of helical form having its stationary end connected to the conduit $b$, and having its movable end secured to an arm $C'$, which is pivoted to turn about an axis $C^2$, clockwise or counterclockwise, as the pressure in the tube rises or falls.

Through suitable connections, the oscillations of the arm $C'$ give motion to the valve $d$, which, as shown, forms a part of a control pressure regulator or air controller unit D, and regulates the escape of air from, and thereby regulates the control air pressure in the regulator chamber $D'$. The latter receives air through a pipe E, a coupling EA and pipe EB from air supply means, which as shown, comprises a chamber F receiving air under pressure through a supply pipe G, and comprises means for maintaining a substantially constant pressure in the chamber, somewhat smaller than the pressure in the pipe G, notwithstanding fluctuations in the last mentioned pressure. The flow through the pipe E into the pipe EB is restricted so that the pressure in the pipe EB may normally be the same as that in the chamber D' and below that in the chamber F. The particular means shown in Fig. 6 for so restricting the flow into the pipe EB through pipe E comprises a restricted orifice E' in an orifice plate member clamped between separate sections of the coupling EA with the part E' interposed between channels in the latter which communicate with and in effect form extensions of the pipes E and EB.

The variable air pressure maintained in the chamber D' is transmitted through a pipe EC in free communication through a channel in the coupling EA with the pipe EB to the pressure regulator diaphragm chamber H' of a fluid pressure relay device having a main pressure chamber H. The latter receives air under pressure through the passage FH from a suitable source which advantageously, and as shown, is the chamber F, and means are provided for maintaining a pressure in the chamber H which varies with the pressure in the diaphragm chamber H' and hence with the control pressure in the regulator chamber D'. The pressure in the chamber H is transmitted by a conduit $Ha$ to the pressure chamber $a'$ of the valve $a$, which is a fluid pressure valve opening and closing to increase or decrease the heat supply to the furnace A as the control pressure in the regulator D rises and falls.

All the above mentioned parts, except the furnace A, valve $a$ and bulb B, are advantageously combined in a control instrument, which, as shown in Figs. 2, 3 and 4 may well be a recording meter similar in general form to a commercial type of meter used for recording temperature and pressure changes. In the form shown, the meter casing I comprises a cylindrical body portion with a partition wall I' therein forming a support for a chart J which is carried by a shaft J', and continuously rotated by the usual mechanism (not shown) located in the casing back of the wall I'. The meter pen K' is carried by an element K pivoted to oscillate about an axis $K^2$. The major portion of the element K is back of the wall I' but an arm portion $K^3$ extends through a wall slot $I^2$. A normally adjustable index L may be set to indicate the normal temperature to be maintained or approximated. The element K is oscillated about the axis $K^2$ through a link CK by the member C', which, with the Bourdon tube C, is in the meter casing I back of the wall I'. The pressure regulator or air controller unit D is also located in the casing I back of the wall I'.

The air controller unit D, in the preferred construction illustrated, comprises a cup-shaped casing body forming the cylindrical outer wall and one end wall of the chamber D'. The open end of the casing body is normally closed by an end head $D^2$ removably attached thereto. The bleeder outlet $D^{30}$ from the chamber D' controlled by the valve $d$ is formed by the axial passage in a bolt-like nozzle member $D^3$ threaded through an opening in the head $D^2$ and having its enlarged outer end rounded to form a convex surface facing the valve $d$ and the annular portion of which immediately adjacent the passage $D^{30}$ forms a seat for the valve $d$. The latter is in the form of a thin plate or bar which extends generally parallel to and diametrally of the end head $D^2$, with one end in front of the nozzle part $D^3$ which is located adjacent one side of the end head. The end of the valve member $d$ remote from the nozzle $D^3$ is pivotally connected to the end head $D^2$. As shown the pivotal connection comprises spaced apart transverse projections $d'$ from the valve member $d$, and a hinge shaft $d^2$ passing through those projections and through hinge lugs $d^4$ carried by the end head $D^2$.

The operating connections for the valve member $d$ include a bell crank lever M pivotally connected to the member $d$ at a distance from the hinge shaft $d^2$. As shown, the lever M is carried on a shaft M' having its ends mounted in transversely extending projections $d^3$ from the valve member $d$. One arm $M^5$ of the bell crank lever M extends in a direction generally transverse to the valve member $d$ and is formed with a slotted guideway $M^2$ for an adjustable connector $KD'$ to which is pivotally connected one end of a link KD. The other end of the link KD is pivotally connected to an arm portion $K^4$ of the element K. The second arm $M^3$ of the bell crank lever M extends approximately parallel to the valve member $d$ away from the hinge shaft M' and toward the hinge shaft $d^2$ and is pivotally connected by a link member MN to an abutment N, the latter being located within the casing body of the unit D into which the link MN extends axially through a central opening in the end head $D^2$. To permit adjustment of the relation of bell crank lever M and abutment N through link MN the lever arm $M^3$ is made adjustable with respect to slotted lever arm. Such adjustment is desirable in the initial calibration of the instrument and in the field to compensate for variations in length of the link MN or in the hereinafter described bellows O. The arm $M^3$ is adjusted angularly about the shaft M' with respect to the slotted arm of lever M by means of eccentric screw $M^4$ which is journaled in an arm $M^5$ integral with the slotted lever arm. The eccentric screw $M^4$ cooperates with the slot $M^6$ in an integral extension of arm $M^3$. A locking screw $M^7$ threaded into the slotted arm and slideable in slot $M^8$ of arm $M^3$ serves, when tightened, to hold the arms $M^3$ and $M^5$ in any desired relative adjustment.

As the element K rotates clockwise or counterclockwise in response to an increase or decrease of pressure in the Bourdon tube C, the lever M is correspondingly oscillated, and as a result of the reaction between the lever and the abutment N, the valve member $d$ is thereby moved away from or toward the nozzle $D^3$ and consequently decreases or increases the air pressure in the chamber D'.

Preferably the guideway $M^2$ extends circularly about a center approximately coincident with the axis of the pivotal connection between the part $K^4$ and link KD. In consequence, adjustment of the part $KD^1$ along the guideway $M^2$ changes the leverage with which the part $K^4$, and thereby the part $C^2$, acts on the lever M, but does not change the position of the part $K^4$ at which the latter tends to hold the valve $d$ against its seat in any particular adjustments of the casing body of the regulator D and the abutment N thereof. Such change of leverage, however, changes the extent of movement of the valve $d$ away from the nozzle $D^3$ produced by a clockwise movement of the part $K^4$ of given magnitude.

The angular position of the part $K^4$ at which the valve $d$ occupies the intermediate position in its range of movement toward and away from the nozzle $D^3$ at which the air flow through the passage $D^{30}$ is equal to the air flow through the restricted part E' determines the temperature which the control apparatus tends to maintain. Ordinarily the temperature maintained, and therefore the corresponding normal position of the part $K^4$, should be adjustable. In the arrangement shown, such adjustment is provided for by pivotally mounting the casing of the device D on a movable bracket D⁵ shown clearly in Fig. 5 which is angularly adjustable about the axis of the shaft K². The index L is rigidly attached to the bracket D⁵ by means of screws D⁶, and the bracket D⁵, device D and index L may be rotated as a unit about the shaft K² until the index tip indicates upon chart J the temperature desired to be maintained. The means by which the bracket D⁵ and associated parts are angularly adjusted include a spur gear D⁷ rigidly attached to the bracket by screws D⁶ and gears D⁸ and D⁹. A manually adjustable knurled nut D¹⁰ secured to the gear D⁹ serves when rotated to rotate the bracket D⁵, unit D and index L and thereby vary the furnace temperature which the apparatus tends to maintain. The angular adjustment of the casing body about the shaft K² in the counter-clockwise direction tends to move the nozzle D³ away from the valve d and thus lowers the temperature which the apparatus tends to maintain. Conversely an adjustment of the casing body in the clockwise direction increases the temperature which the apparatus tends to maintain.

For purposes hereinafter explained, the abutment N is not stationary but is moved toward and away from the valve member d, following and as a result of an increase or decrease respectively in the pressure in the chamber D'. The abutment N is so moved as a result of the variations in the air pressure acting on the outer side of a bellows element O which is axially disposed within the device D and of which the abutment N forms a movable end wall. The end of the bellows element O remote from the abutment N is anchored to the end head D². The interior of the bellows is in free communication with the atmosphere through the center opening d⁷ in the end head D². Surrounding the bellows O is a second bellows P which has its inner end closed and its outer end connected to the end member D². The chamber space OP between the bellows elements O and P is in restricted communication with the atmosphere through a passage d⁸ in the end wall D², the rate of air flow through said passage being regulable. The means shown for regulating the flow through the passage d⁸ is in the form of a grooved screw obturator d⁹ threaded into the outer end of the passage, and throttling the latter more or less, according to the extent to which it extends into the passage.

Each of the bellows elements O and P has longitudinal resilience. In consequence each bellows has a definite length when the pressures acting on its inner and outer walls are the same. When those pressures are unequal, the extent to which the bellows is elongated if the external pressure exceeds the internal pressure, or is contracted if the internal pressure exceeds the external pressure, is that required to make the differential of the internal and external pressures acting on the bellows, equal to the opposing resilient bellows force which results from the contraction or elongation of the bellows, said resilient force of itself always tending to return the bellows to its normal or unstressed length.

On an increase in the pressure within the Bourdon tube C and a consequent movement of the part K⁴ in the clockwise direction, the valve d is moved by a corresponding distance away from the nozzle D³, thereby reducing the pressure in D'. The pressure reduction in D' elongates the bellows P. The first effect of its elongation is to enlarge the inter-bellows space OP and to reduce the pressure in the latter owing to the relatively slow inflow of air permitted by the restricted passage d⁸. The reduction in pressure in OP elongates the bellows O. The resultant movement of the abutment N away from the end head D² moves the valve d back toward the nozzle D³ thereby tending to increase the pressure in chamber D'. In practice the mechanism is so proportioned and adjusted that the effect on the pressure in D' of a change in position of the part K⁴ is only partially neutralized by the effect of the pressure change on the length of the bellows O. The decrease in pressure in chamber OP produces an inflow of air through the passage d⁸ which tends to slowly bring the pressure in chamber OP into equality with the pressure of the atmosphere. As the pressure in the chamber OP builds up, the bellows O shortens and thereby moves the valve d away from the nozzle D³ and back towards the position into which it was moved on the original change in position of the part K⁴, provided the latter remains stationary in the meantime. The converse of the actions just described occur on a rise in the pressure in the Bourdon tube C and a corresponding adjustment of the part K⁴ in the counter-clockwise direction.

While the adjustment at any time of the valve mechanism comprising the port or passage D³⁰ and member d, depends on the relative positions at the time of the parts K⁴ and N, the position and movement of each of those parts is independent of the position of the other. It is to be noted, moreover, that the apparatus is so proportioned that the repulsive effect on the valve d of the air flow through the port D³⁰ is too small to have any significant effect on the positions and movements of either of the parts K⁴ and N.

From what has just been said, it will be apparent that the first effect of a change in the controlling condition and corresponding change in the parts K⁴ is to produce a corresponding initial change in pressure in the chamber D'. This initial change in pressure in the chamber D' is automatically followed by a smaller reverse change in pressure, as the initial change effects a reversal of direction of the change in the controlling condition and the control apparatus may be adjusted so that the corresponding initial adjustment of the control valve a is quick enough and great enough to produce a substantial corrective effect without giving rise to such a hunting difficulty as would exist but for the automatic reverse change in pressure in the chamber D¹.

If it be assumed, for example, that an initial clockwise change of the position of the part K⁴ occurs as a result of an increase in temperature due to a decrease in furnace load which continues for some time so that less fuel is needed than was previously required, said change may well produce a temporarily excessive initial decrease in pressure in chamber D¹, such that, if maintained, fuel would be supplied to the furnace more slowly than required to continuously meet the then existing demand on the furnace for heat. The extent of this decrease in pressure in D¹ is gauged by the movement given the valve d by the expansion of the bellows O, occurring as a result of such decrease. Such initial excess in fuel reduction tends quickly to arrest the rise of the furnace temperature, and to decrease that temperature. As the furnace temperature falls, the lever K⁴ turns counter-clockwise and the tendency to an excessive decrease in that temperature is neutralized more or less by an accompanying increase in pressure in the chamber D¹, resulting from the movement given the valve d by the counter-clockwise motion of lever K⁴, the magnitude of the increase being gauged by the compression of bellows O occurring as a result of such increase. The subsequent slow compression of the bellows O, as the pressure in the chamber OP approaches equality with that of the atmosphere, again tends to decrease the fuel supply to the furnace, but unless the furnace load has become still smaller in the meantime, the effect on position of the valve d of such compression of the bellows O will be partially neutralized by the decrease in the furnace temperature and resultant counter-clockwise change in position of the part K⁴. If the demand on the furnace for heat does not change after the bellows O has contracted to its normal or unflexed length, the valve d will come to rest with the part K⁴ in a position corresponding to a furnace temperature slightly higher than would exist in a stable operating condition with a larger demand on the furnace for heat.

Figure 8:
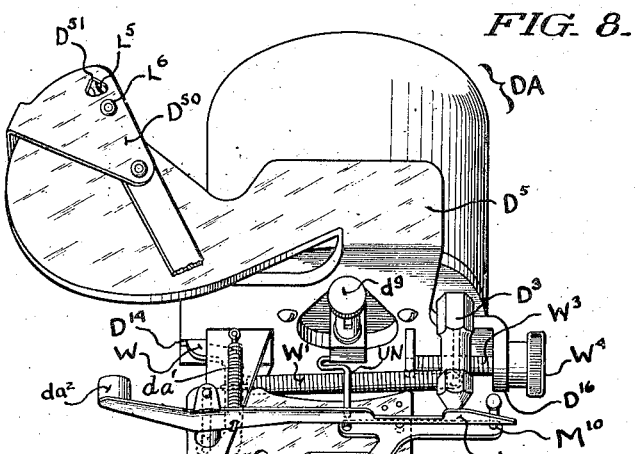
Fig. 8 is a perspective view of the unit shown in Fig. 7.

In the instrument shown in Figs. 2, 8 and 4 the pressure regulator chamber F and the relay pressure chambers H and H¹ are formed in a box-like extension IA from the cylindrical casing body, and the passage FH comprises drill hole sections in the wall of said extension. The pipe G communicates with the chamber F through the axial passage in a nozzle member F′ controlled by a valve member Q, and a similar valve member QA in the chamber H serves as the pilot valve for maintaining the pressure in the chamber H equal to the pressure in the chamber D′.

Each of the valves Q and QA as shown comprises a tongue-like flexible part with offset lateral projections Q′ at one end which are screw connected to one side wall of the corresponding chamber F or H. Between its ends, the tongue portion of each of the valves Q and QA is acted on by a diaphragm. The diaphragm f in the chamber F tends to move the free end of the valve Q toward or away from the nozzle F′, accordingly as the pressure in the chamber F rises above or falls below a predetermined pressure which balances the action on the diaphragm of a pressure controlling spring R.

In the chamber H, the diaphragm h acting on the valve QA forms a flexible partition wall between the chambers H and H¹. When the pressure in the chamber H¹ increases relative to the pressure in the chamber H, the free end of the valve QA is moved closer to a nozzle member H² to thereby restrict the escape of air from the chamber H through the axial vent passage formed in the member H². This movement of the valve QA increases the distance between the free end of the latter and a nozzle member H³, thereby permitting of an increased flow or air into the chamber H from the chamber F through the passage FH which communicates with the chamber H through the axial passage in the nozzle H³. As shown, an apertured member q extending over each of the diaphragms f and h, is formed with tongues q′ which extend under the tongue portion of the corresponding valve Q or Qa and prevents undue flexure of the latter when the pressure in the corresponding chamber is abnormally high. Lugs f′ and h′, secured to the diaphragms f and h, are provided with buttons f² and h², abutting the under-surface of tongues Q and Qa respectively and upstanding portions f³ and h³ formed with extensions f⁴ and h⁴, which overlie and abut the top surfaces of the tongues Q and Qa, so the tongues Q and Qa are compelled to share the motions of their respective diaphragms f and h. SF and SH are pressure gauges responsive to the pressures F and H respectively, and advantageously are mounted as shown in recesses provided for the purpose in the front walls of the chambers F and H. To avoid risk of injury from excessively high air pressure, a safety valve T is advantageously provided. As shown the safety valve is in communication with a branch of the passage FH.

An outstanding advantage of our invention, as disclosed in the foregoing embodiment, resides in the elimination of one or more relay stage or stages found necessary in devices of the prior art directed to the same general purpose. It is to be noted that the lever K⁴, moving in accordance with the variable condition, directly acts through rigid linkage to vary the control pressure in the chamber D¹ without the necessity for the action of additional pilot valves or the like, and insures immediate follow-up action of bellows O and P to partially neutralize and to stabilize the resultant effect of the movement of lever K⁴. Similarly, the action of bellows O and P is immediately effective upon the pressure in chamber D¹ without the introduction of time lag, which lag may and does result in the use of the devices of the prior art wherein intermediary relay stages are employed. By so minimizing the period of the mechanism, we are able to halt the building up or falling off of pressure in chamber D¹ at the instant that the necessary pressure condition is reached without tending to set up an objectionable oscillatory action.

It will be apparent that the air flow past obturator D⁹ into or out of the inter-bellows space OP, accordingly as the pressure therein is below or above atmospheric pressure respectively, is advantageously related to a fixed normal (atmospheric pressure), irrespective of the control pressure existing in the chamber D¹. This permits of modification of the parts, as, for example, in Figs. 7, 8 and 9, whereby such parts may consistently operate correctly under all of the pressures which the device may be called upon to control.

In some cases, it is desirable at times to operate with a manually controlled pressure in the pressure chamber a′ of the valve a. Such operation is made possible by the inclusion of parts shown in Fig. 3, but not previously referred to, whereby for such manual control, free communication is established between the supply chamber F and power chamber H, and the valve Q is caused to maintain a pressure in the chamber F equal to the pressure then maintained in the chamber a′, and lower than the pressure maintained in the chamber in regular operation. Such free communication between the chambers F and H is established by backing off a screw valve fh′ which in regular operation closes a passage fh formed in the casing part IA and extending between the chambers F and H. The desired pressure reduction in the chamber F might be secured by reducing the tension of the previously described spring R.

In practice we consider it preferable, however, to provide the valve member Q with a spring extension Qa at its free end and a cooperating screw Q³ threaded through the wall of the chamber F. In regular operation, the screw Q³ is backed off to clear the spring extension Qa, but for manual control, the screw is advanced into such engagement with Qa that the tension of the latter neutralizes so much of the force exerted on the valve Q by the spring R as is necessary to maintain the pressure desired in the chamber F, the pressure so maintained being indicated by the gage SF. With a passage $fh$ of adequate flow capacity, when the screw $fh'$ is backed off the pressure transmitted through the pipe Ha to the chamber $a'$ is substantially independent of the operation of the valve Qa and it is therefore unnecessary to interrupt flow through the pipes E, EB and Ec or otherwise interfere with the unit D which is functionless during manual control period of operations.

Figure 9:
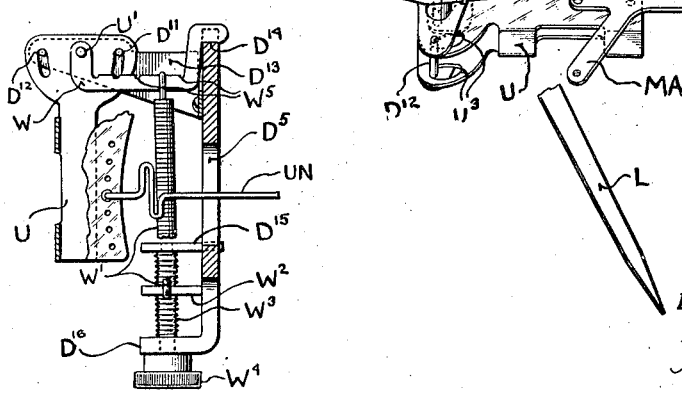
Fig. 9 is an elevation with parts broken away and in section of a portion of the unit shown in Figs. 7 and 8.

In Figs. 7, 8 and 9 we have illustrated an air controller unit differing somewhat from the previously described unit D and which we consider preferable to the latter in some respects, and particularly for use under certain conditions. The flapper valve $da$ of the unit DA differs from the corresponding valve $d$ of the unit D in form and in the manner of its engagement with the means for supporting and giving it its movements. Furthermore, the valve operating provisions of the unit DA include means whereby changes in the value of the controlling quantity may produce pressure variation in the air chamber $D^1$ which are somewhat different from the pressure variations produced in the unit D by the same changes in controlling quantity value, and whereby the relation between such changes and variations may advantageously be adjusted in the unit DA to accommodate differences in conditions of use, and particularly differences in the closeness of regulation obtained. Except in respect to the form of flapper valve $da$ and the operation provisions for the latter, the unit DA does not differ significantly, and need not differ at all, from the unit D.

The valve $da$ is shown as pivoted on a pivot pin $U^1$ carried by lever element U. The latter is mounted on the bracket $D^5$. As shown, the mounting for the member U comprises two pins $D^{11}$ and $D^{12}$ at the opposite ends of the axis of the unit from the nozzle member $D^3$, and spaced apart in the direction of the axis of the unit.

The pins $D^{11}$ and $D^{12}$ have their opposite ends secured in the opposed limbs of a U shaped support $D^{13}$ secured to the bracket $D^5$. The pins $D^{11}$ and $D^{12}$ extend through openings $U^2$ and $U^3$ formed in the member U and elongated in a direction transverse to the axis of the unit. Resilient means acting on the member U, tend to hold the latter in a normal position in which the end walls of the openings $U^2$ and $U^3$ remote from the axis of the unit bear against the pins $D^{11}$ and $D^{12}$ respectively, as shown in Fig. 9.

The resilient means shown for this purpose comprise a lever W having a fulcrum bearing at the bottom of a slot $D^{14}$ in the bracket $D^5$. At its opposite end the lever W engages the member U between the openings $U^2$ and $U^3$. As shown, that engagement is in the form of a loose pivotal connection between the lever W and the pivot pin $U^1$. Between its ends the lever W is engaged by a tension spring $W^1$ extending in front of the housing and having its opposite end connected to a tension adjusting device. The latter is shown as comprising a nut $W^2$ to which the corresponding end of the spring $W^1$ is directly connected and through which is threaded a screw $W^3$. The latter is mounted for rotation in, and is held against longitudinal movement by extensions $D^{15}$ and $D^{16}$ from the bracket $D^5$. At its outer end, the screw $W^3$ is provided with a knurled knob $W^4$ to facilitate rotation of the screw in adjusting the tension of the spring $W^1$. The leverage with which that spring acts on the lever W may be varied by shifting the lever engaging end loop of the spring $W^1$ into one or another of the different notches $W^5$ formed for the purpose in the lever W.

The member U is connected to the abutment N or closed end of the bellows O by a link member UN replacing the link MN of the unit D. The link UN has a hook end which may be inserted in one or another of the holes $U^4$ formed in the member U at different distances from the axis of the unit to thereby vary the leverage with which the bellows O operates on the member U. As shown, the link UN comprises a reversely curved portion $UN'$, the shape of which may be varied by a pair of pliers or by the fingers of the user as required to vary the effective length of the link, in calibrating the instrument, so that when the bellows O is neither contracted nor expanded but is of normal length, the member U will occupy its normal position with the ends of the openings $U^2$ and $U^3$ bearing against the pins $D^{11}$ and $D^{12}$ as shown in Fig. 9.

The throttle valve $da$ is biased toward the position in which it seats on the nozzle member $D^3$ and closes the passage through the latter, by a light spring $da'$ acting between the valve member and the bracket $D^5$. The valve $da$ is given movements away from the nozzle member $D^3$ by the oscillation of a lever member MA turning about a pivot $U^5$ carried by the member U, and having an arm connected to the link KD and thereby to the operating member $K^4$. With the arrangement shown in which a clockwise adjustment of the arm $K^4$ should move the valve member $da$ away from its seat, such movement is effected by a pin projection $M^{10}$ from the lever MA. In a condition of operation in which counter-clockwise movement of the arm $K^4$ should move the valve $da$ away from its seat, such movement may be effected by mounting the pin projection $M^{10}$ in an opening $M^{11}$ formed for the purpose in an extension of the lever MA at the opposite side of the pivot $U^5$ from that at which the pin $M^{10}$ is shown in Figs. 7 and 8.

The described arrangement for mounting and operating the valve $da$ permits the latter to be a sheet metal stamping desirably light in weight and easily movable. It may be provided with a small counterweight $da^2$ as shown to obtain gravital balance about the pivot $U'$. Advantageously, the valve member $da$ is curved or trough-shaped in cross-section as shown with the pin $M^{10}$ engaging one side edge so that the engagement is of the line and point contact type. The troughing of the valve member $da$ also gives the latter additional stiffness.

In the operation of the apparatus shown, on a change in the value of the controlling quantity moving the part $K^4$ in a clockwise direction, the valve $da$ is moved away from the nozzle $D^3$, thereby reducing the pressure in the chamber space $D'$. That pressure reduction elongates the bellows P and thereby enlarges the interbellows space OP and reduces the pressure in the latter. The pressure reduction in OP elongates the bellows O and thereby through the link UN causes the member U to rock in the counter-clockwise direction about the pin $D^{12}$. The resultant movement of the pivot $U^5$ produces a corresponding movement of the valve member $da$ toward the nozzle $D^3$ and thereby determines the amount of change of pressure in $D^1$ according to the amount of movement of lever $K^4$. Thereafter, assuming no further change in position of the part $K^4$, the pressure in the space OP tends to gradually build up to an equality with the pressure of the atmosphere, and the bellows O starts to contract to its normal length, and to return the member U to its normal position in engagement with both pins $D^{11}$ and $D^{12}$. This initial return movement to normal position of the member U gives the valve member $da$ a corresponding movement away from the nozzle $D^3$. As valve member $da$ starts to move away from the nozzle, the pressure in chamber $D^1$ will be still further reduced resulting in a further increase in the volume of space OP, again returning the pressure therein to its former reduced value, and bringing the valve member back toward the nozzle to check a further reduction in pressure in chamber $D^1$. This process will continue as long as part $K^4$ does not change its position, until the pressure in chamber $D^1$ eventually produces enough action on the valve $a$ to cause the temperature to approach normal, or until the pressure in chamber $D^1$ has reached the minimum value provided by the system. Ordinarily, the temperature will respond before this limiting condition has been reached; and so long as that condition is not reached, a definite pressure will be sustained in space OP corresponding to the then position of lever $K^4$, and, as air leaks into this space, the pressure in chamber $D^1$ will be caused to continuously decrease by operation of the valve member $da$ to maintain such pressure in space OP. The described sequence of operations is the same as produced under the same conditions by the unit D, except as the tension means including the lever W and the spring $W^1$ modifies the magnitude and rate of the movement of the parts, and the character of the pressure changes produced within the control unit.

The primary effect of the tension means is to restrain from elongation the bellows O in response to the initial reduction in pressure in space $D^1$, and to thereby increase the amount of such reduction in pressure necessary to produce a movement of the valve member $da$ toward the nozzle $D^3$ which occurs when the bellows O is elongated as a result of the pressure reduction in the space $D^1$.

An understanding of the effect of the tension of spring $W^1$ upon the control of the furnace A may be facilitated by reference to Fig. 10, which is a composite record including two curves KT and KP. The curve KT represents the movement of pen $K^1$ and is a measure of the controlling condition such as the temperature measured by the thermocouple B. The curve KP represents the pressure impressed on valve $a$, and thus is a measure of the fuel valve opening and, accordingly, of the fuel supplied. The curves shown in Fig. 10 are reproductions of records made in actual practice with the instrument disclosed herein.

In Fig. 10, the circular lines $KP^1$ and $KP^2$ represent the minimum and the maximum pressures required to operate the valve $a$ between its closed and open positions, which positions may be and preferably are fully closed and fully opened. The line $KT^1$ represents the value of the constant temperature in the furnace A as indicated by the index L of Fig. 1 or other condition to be maintained. The lines $Kt$ are radial time lines for the purpose of indicating the corresponding values on the curves KT and KP with respect to time. From Fig. 10, it is apparent that, upon each departure above the predetermined normal $KT^1$ of the curve KT, a substantial and rapid decrease in the pressure on the valve $a$ results, such increase being in a direction and of such force as to return the temperature and, accordingly, curve KT to normal. The rapid reversal portions $KP^3$—$KP^4$ of the curve representing the initial pressure impressed on valve $a$, depends upon the existing adjustment of spring $W^1$ and the magnitude of the departure of line KT and lever $K^4$ from normal. It will also be seen from Fig. 10 that, partially resulting from, and in addition to the change in the magnitude of the initial correction represented by $KP^3$—$KP^4$ on the curve KP, the subsequent coaction of lever $K^4$ and unit DA will be such as to vary the pressure in valve $a$ throughout its range $KP^1$—$KP^2$ of movements so far as necessary to maintain a substantially constant furnace condition. The adjustment of spring $W^1$ has three separate effects, two controlled by the initial tension put on the spring by means of nut $W^4$, and one controlled by the rate of increase of spring tension with deflection of part U away from its position of contact with both of pins $D^{11}$ and $D^{12}$. It will be clear from the foregoing that the initial tension of spring $W^1$ is adjusted in practice by means of nut $W^4$ to the optimum position to effect the correction immediately upon departure of the temperature in the furnace space from normal. The action will be such, therefore, as to check immediately the tendency for such departure with the least extent of departure and with the least corrective action. Reverse action will, accordingly, follow immediately upon the temperature passing through normal, the urge being always toward normal.

A further effect of an adjustment of the initial tension of the spring $W^1$ is to obtain a desirable law for the rate of return to normal of the temperature upon a departure therefrom. The proportioning of the parts is such as to produce actions and reactions of and between lever MA and unit DA that result in a return of the temperature, represented, for example, by the curve KT, in accordance with a modified square law. The constants and variables of the control system comprising the law underlying the operation of the system effect return of the condition to normal at a desirably rapid rate as normal is neared, which, under the simple square law, might well not result. If, for example, in the apparatus not employing spring $W^1$, the simple law were such that the return to normal were desirably great as normal were neared, the corresponding control actions upon a departure of great magnitude would be excessive; and, if the foregoing were remedied by providing corrections of the proper magnitude upon great departure, the corrections would be undesirably small when neutral were neared. With the use of spring $W^1$, the desirable operation is obtained of corrections of the proper magnitude for both small and large deviations.

The relative adjustments of obturator $d^9$ and spring $W^1$ are such as provide the desirable magnitude of correction for small and large deviations. The portion $KP^3$—$KP^4$ of the curve KP represents the large initial change in pressure on the valve $a$ and results from the initial tension of spring $W^1$ as before described, but simultaneously with said change in pressure occurs a flow of air through passage $d^8$ which lessens the amount by which the initial change in pressure is neutralized by the follow-up action of bellows O and P. Such action produces the relatively slowly occurring changes of the curve KP represented by the portions of the curve, in many instances not clearly defined, other than the portions KP³—KP⁴. More specifically, upon a small deviation above normal of curve KT and member K⁴, the time of response of bellows O and P will be relatively rapid; but, notwithstanding such rapidity of elongation of bellows O and P, air will concurrently flow into space DP to thereby lengthen the force transmitting link between chamber D¹ and member da, which comprises the rigid link UN and the air cushion in the space OP between the inner end of the bellows O and P and to thereby diminish the amount of return movement of member da in neutralization of the initial movement of the latter. A correspondingly greater diminution of the return motion of member da is made upon a greater departure from normal of curve KT and member K⁴ resulting from a less rapid response of bellows O and P and therefore a longer time period during which air flows through passage d⁸.

While the foregoing effects result from the initial tension of the spring W¹, adjustment of the rate of increase of spring reaction upon part U, as it moves farther away from its position of seating upon both pins D¹¹ and D¹², it is desirable to vary the response of the bellows O throughout its entire range of movement, such as might be obtained by making that bellows of a material providing different amounts of longitudinal bellows resilience. This is accomplished by the means hereinbefore described, whereby the points of attachment of the spring W¹ to the lever W is shifted away from and toward the pivotal point of the latter. Such adjustment of spring W¹ does not change the law upon which the system operates, however, but varies the constants thereof so as to provide resulting control action of the proper magnitude.

While, as previously explained the index L is normally adjusted when such adjustment is necessary for calibration purposes, by bodily adjustment of the unit supporting bracket D⁵, provision for the independent adjustment of the index are desirable. In Figs. 7 and 8 we have illustrated a novel arrangement for effecting such an adjustment of an index such as index L. As shown in those figures the index L is pivotally connected to an extension portion D⁵⁰ of the bracket D⁵, to turn about the axis K². The portion D⁵⁰ is in front of and spaced away from the body of the bracket D⁵, and in the assembled instrument is in front of the partition wall I', and is connected to the body portion of the bracket D⁵ by a neck portion extending through the opening I² in wall I'. The index L is frictionally held in any position relative to the part D⁵⁰ into which it may be angularly adjusted, as by means of a grommet L⁶ extending through the part D⁵⁰ and having a flange portion at the back of the latter which frictionally engages the adjacent side of the index L. The part D⁵⁰ is formed at a distance from the axis K² with an opening having two sides meeting at an angle to provide a sort of fulcrum bearing D⁵¹ for the edge of a screw driver blade or similar implement which may be extended through the opening, as indicated in dotted lines in Fig. 7, when adjustment of the index L relative to the part D⁵⁰ is required. When so inserted, the screw driver blade enters a tapered notch L⁵ formed for the purpose in the adjacent end of the index L. As will be apparent by rocking of the screw driver blade so inserted in the notch D⁵¹, the index L may be adjusted about the axis K² relative to the part D⁵⁰, in an easy and accurate manner. Certain control apparatus combinations including provisions whereby follow up and compensating actions may be adjusted which are disclosed but not claimed herein, are claimed in our co-pending application, Ser. No. 32,028, filed July 18, 1935.

While in accordance with the provisions of the statutes, we have illustrated and described the best forms of embodiment of our invention now known to us, it will be apparent to those skilled in the art that changes may be made in the form of the apparatus disclosed without departing from the spirit of our invention as set forth in the appended claims, and that in some cases certain features of our invention may be used to advantage without a corresponding use of other features.

Having now described our invention, what we claim as new and desire to secure by Letters Patent, is:

1. In control apparatus, the combination of a device adjusted to different positions in accordance with changes in a variable controlling condition, a stationary air pressure nozzle, a closure member therefor adjustable to regulate the air pressure in said nozzle, means through which a movement of said device from one position to another adjusts said closure member to vary said pressure in a direction depending upon the direction of said movement, and follow-up adjustment mechanism operating through said means independently of the device and directly actuated by a change in said pressure to adjust said closure member to partially neutralize said change.

2. In a control system, the combination of a device adjusted to different positions in accordance with changes in a variable controlling condition, a stationary air pressure nozzle, a closure member therefor adjustable to regulate the air pressure in said nozzle, means through which a movement of said device from one position to another adjusts said closure member to vary said pressure in a direction and to an extent depending upon the direction and magnitude of said movement, and mechanism operating independently of the position of said closure member and actuated directly by a change in said pressure to effect an adjustment of said closure member in a direction and to an extent partially neutralizing said change, and including means for subsequently eliminating said adjustment.

3. In control apparatus, the combination of a device adjusted to different positions in accordance with changes in a variable controlling condition, air pressure controlled means, a valve mechanism adjustable to directly regulate the air pressure acting on said means, means through which a movement of said device from one position to another adjusts said valve mechanism to vary said pressure in a direction and to an extent depending upon the direction and magnitude of said movement, and an element movable independently of the position of said device and biased to an initial position independent of the actual value of said pressure and displaced from said position by a change in said pressure in a direction depending upon the direction of said change, and operating on a movement in either direction from its initial position to directly adjust said valve mechanism in a direction to partially neutralize the change in said pressure producing the last mentioned movement.

4. An air controller unit comprising a casing including an air chamber, a port communicating with said chamber, a valve member cooperating with said port to control flow therethrough, a valve operating member, and independently operable adjusting connections for said operating member one of said connections being movable independently of the pressure in said chamber, and follow-up adjustment means through which the other connection is directly moved by a change in said pressure in a direction depending upon the direction of, and tending to neutralize said change in pressure.

5. An air controller unit comprising a casing including an air chamber, a port communicating with said chamber, a valve member cooperating with said port to control flow therethrough and operating means for said valve member comprising a lever and two operating connections to said lever each adapted to provide a lever fulcrum for movement of the valve by the other, one of said connections being movable independently of the pressure in said chamber, and means through which the other connection is moved by a change in said pressure in a direction tending to neutralize said change.

6. An air controller unit comprising a casing including an air chamber, a port communicating with said chamber, a valve member cooperating with said port to control flow therethrough and operating means for said valve member comprising a lever and two operating connections to said lever each adapted to provide a lever fulcrum for movement of the valve by the other, one of said connections being movable independently of the pressure in said chamber, and means through which the other connection is initially moved by a change in said pressure in a direction tending to neutralize said change and is thereafter given a slow return movement.

7. An air controller unit comprising a casing including an air chamber, a port communicating with said chamber, a valve member pivotally connected to said casing to turn toward and away from said port and thereby control flow therethrough, and operating means for said valve member comprising a lever pivotally connected to the valve member and two operating connections to said lever each adapted to provide a lever fulcrum for movement of the valve by the other, one of said connections being movable independently of the pressure in said chamber, and means through which the other connection is given movements by changes in pressure in said chamber.

8. An air control unit comprising a rigid casing part and a flexible wall element connected to said part to form an air chamber between said part and element, means for maintaining a variable air pressure in said chamber comprising a port and a valve member controlling flow through said port, a second flexible wall element connected to the first mentioned element to provide a chamber space between the two elements, said space being in restricted communication with the atmosphere, and the side of said second element remote from said space being exposed to the pressure of the atmosphere, a connection from said second flexible wall element by which movements of the latter moves said valve member toward and away from said port to variably throttle flow through the latter, and a second connection to said valve member movable independently of the first mentioned connection to move said valve toward and away from its seat.

9. An air controller unit comprising a casing body, a bellows extending into said casing body and having its inner end closed and its outer end connected to said body to form an air chamber enveloping said bellows, means for maintaining a variable air pressure in said chamber comprising a port and a valve member controlling flow through said port, a second and smaller bellows mounted within the first mentioned bellows and having its inner end closed and having its outer end connected to the outer end of the first mentioned bellows thereby providing a chamber space between the two elements, said space being in restricted communication with the atmosphere, a lever by which said valve member is moved toward and away from said port to variably throttle flow through the latter, a connection between said lever and the movable end of said smaller bellows, and an independently operating connection to said lever, said connections being connected to said lever at spaced apart points, whereby each connection forms a fulcrum for turning movement imparted to the lever by the other connection.

10. In a unitary control meter instrument, the combination of a device movable in response to changes in a variable condition, a supply chamber adapted to receive air under pressure, means regulating the admission of air to said chamber as required to maintain a constant pressure therein, an air controller unit comprising a variable pressure chamber receiving air from said supply chamber and comprising a valve regulating the pressure in said variable pressure chamber, a connection through which said device adjusts said valve, and a fluid pressure relay comprising a regulator chamber, a power chamber, a pressure transmitting connection from said variable pressure chamber to said regulator chamber substantially equalizing the pressures in the last mentioned chambers, an air supply connection to said power chamber from said supply chamber, a pressure transmitting connection leading from said power chamber, and pilot valve means jointly responsive to the pressures in said power and regular chambers for maintaining a pressure in said power chamber varying with the pressure in said regulator chamber.

11. In a unitary control meter instrument, the combination of a device movable in response to changes in a variable condition, a supply chamber adapted to receive air under pressure, means regulating the admission of air to said chamber as required to maintain a constant pressure therein, an air controller unit comprising a variable pressure chamber receiving air from said supply chamber and comprising a valve regulating the pressure in said variable pressure chamber, a connection through which said device adjusts said valve, and a fluid pressure relay comprising a regulator chamber, a power chamber, a pressure transmitting connection from said variable pressure chamber to said regulator chamber substantially equalizing the pressures in the last mentioned chambers, an air supply connection to said power chamber from said supply chamber, and pilot valve means jointly responsive to the pressures in said power and regular chambers controlling flow through the last mentioned connection and normally maintaining a pressure in said power chamber varying with the pressure in said regulator chamber, a pressure transmitting connection leading from said power chamber, and means adjustable to establish free communication between said supply and power chambers when operation with equal pressures in said supply and power chamber is desired.

12. Control apparatus comprising in combination, a fluid pressure supply chamber, means for maintaining a regulated fluid pressure therein, a power chamber, mechanism including a device automatically responsive to changes in a control quantity and including means responsive to the pressure in said power chamber for transmitting pressure fluid from said supply chamber to said power chamber to maintain a pressure therein varying in predetermined relation with the value of said quantity in operation of the apparatus under one condition, and means adjustable to establish free communication between said chambers for operation in another condition in which the last mentioned means makes the pressure in said power chamber independent of the operation of said mechanism and equal to the pressure in said supply chamber.

13. In control apparatus, air pressure actuated control means, a control nozzle, a closure device therefor adjusted to different positions in accordance with changes in a variable control condition to regulate the air pressure acting on said means, second air pressure controlled means actuated by a change in said pressure for moving said closure device in the opposite direction, said second air pressure controlled means including a link of variable length and means automatically varying said link following a change in the said pressure.

14. In control apparatus, air pressure actuated control means, a control nozzle, a closure device therefor adjusted to different positions in accordance with changes in a variable control condition to regulate the air pressure acting on said means, second air pressure controlled means actuated by a change in said pressure for relatively moving said closure device and nozzle in a direction to neutralize said change and including a link of variable length and air pressure controlled means for varying the effective length of said link and normally subject to an air pressure equal to that of atmosphere and means for varying said link by varying the last mentioned pressure above or below the pressure of atmosphere in response to and following a change in one direction or the other in the first mentioned pressure.

15. In control apparatus the combination of a device adjusted to different positions in accordance with the changes in a variable control condition, air pressure actuated control means including means for maintaining an actuating pressure directly proportional to a control pressure acting on said means, a valve mechanism adjustable to regulate the air control pressure acting on said first mentioned means, means through which a movement of said device from one position to another positively adjusts said valve mechanism to vary said control pressure in a direction and to an extent directly proportional to the direction and magnitude of said movement, and second air pressure controlled means actuated by a change in said control pressure through the last mentioned means and independently of said device to directly effect a follow-up adjustment change in said control pressure in the opposite direction.

16. In control apparatus the combination of a device adjusted to different positions in accordance with the changes in a variable control condition, air pressure actuated control means including means for maintaining an actuating pressure directly proportional to a control pressure acting on said means, a valve mechanism adjustable to regulate the control air pressure acting on said means, rigid means through which a movement of said device from one position to another positively adjusts said valve mechanism to vary said control pressure in a direction and to an extent proportional to the direction and magnitude of said movement, second air pressure controlled means actuated by a change in said control pressure to directly effect a change in said control pressure in the opposite direction, and means automatically varying said control pressure in the original direction following a change in said pressure.

17. In control apparatus the combination of a device adjusted to different positions in accordance with the change in a variable control condition, air pressure actuated control means, a valve mechanism adjustable to regulate the air pressure acting on said means, means through which a movement of said device from one position to another adjusts said valve mechanism to vary said pressure in a direction and to an extent corresponding to the direction and magnitude of said movement, and second air pressure controlled means actuated by a change in said pressure to effect a change in said pressure in the opposite direction, and subsequently acting to change said pressure in the direction of the first mentioned change and including a pressure chamber not in communication with said pressure.

18. In a control system of the character described, reacting control means including a pressure chamber, means responsive to a variable control condition for varying the pressure in said chamber in accordance with variations in said condition, and means responsive to the variations in said pressure for limiting the extent of change in said pressure, said last mentioned means including a link of automatically variable length comprising a chamber isolated from said pressure chamber.

19. In a control system of the character described, reacting control means including a pressure chamber, means responsive to a variable control condition for varying the pressure in said chamber in accordance with the variations in said condition, means responsive to the variations in said pressure for neutralizing said change, said last mentioned means including a link of variable length comprising a chamber isolated from said pressure chamber, and automatic means including said isolated chamber for varying said pressure in the same sense as it is varied by the first mentioned means.

20. In control apparatus the combination of a device adjusted to different positions in accordance with the change in a variable control condition, air pressure actuated control means, a valve mechanism adjustable to regulate the air pressure acting on said means, means through which a movement of said device from one position to another adjusts said valve mechanism to vary said pressure in a direction and to an extent corresponding to the direction and magnitude of said movement, and second air pressure controlled means actuated by a change in said pressure to vary the latter in the opposite direction, and subsequently acting pressure means to vary said pressure in the direction in which it is varied by said mechanism, the last mentioned means including a chamber in restricted communication with the atmosphere.

21. An air controller unit comprising a casing including an air chamber, a port communicating with said chamber, a valve member adapted to turn about an axis and thereby cooperating with said port to control flow therethrough, operating means for said valve member comprising a link and a lever, the latter oscillating about an axis removed from the first mentioned axis, and means for angularly adjusting said casing about the last mentioned axis.

22. In an instrument of the character described, the combination with a vent nozzle, of means for variably throttling the discharge through said nozzle comprising two members separately adjustable angularly about different axes and one of which comprises a nozzle discharge obstructing portion the position of which relative to said nozzle is solely dependent upon the angular adjustments of said members and separate means for angularly adjusting said members.

23. In an instrument of the character described, the combination with a vent nozzle, of means for variably throttling the discharge through said nozzle comprising two members separately adjustable angularly about different axes and one of which comprises a nozzle discharge obstructing portion the position of which relative to said nozzle is solely dependent upon the angular adjustments of said members, and separate means for angularly adjusting said members and means for relatively adjusting said members into either of two conditions in one of which angular adjustment of one of said members in one direction modifies the discharge obstructing effect of said portion in a direction opposite to that in which it is modified by the same angular adjustment of the last mentioned member when said members are relatively adjusted into the second of said adjustment condition.

24. In a pneumatic control instrument, the combination of a supply pipe containing fluid under a pressure governed by a variable condition, a unitary body comprising a compartment containing fluid under a pressure governed by the pressure in said supply pipe, and a second compartment containing fluid under a pressure regulated to a predetermined magnitude, a restricted passage between the second compartment and said supply pipe, a passage between said compartments, and means communicating with the first mentioned compartment for controlling said condition.

25. An air controlled unit comprising a rigid casing part and a flexible wall element connected to said part to form an air chamber between said part and element, means for maintaining a variable air pressure in said chamber comprising a port and a valve member controlling flow through said port, and operating means for said valve member comprising a lever pivotally connected to the member and two operating connections to said lever, each adapted to provide a lever fulcrum for movement of the valve member by the other, one of said connections being movable independently of the pressure in said chamber, and means through which the other connection is given movements by said element in response to changes in pressure in said chamber.

26. An air controlled unit comprising a rigid casing part and a flexible wall element connected to said part to form an air chamber between said part and element, means for maintaining a variable air pressure in said chamber comprising a port and a valve member controlling flow through said port, a second flexible wall element connected to the first mentioned element to provide a chamber space between the two elements, and operating means for said valve member comprising a lever pivotally connected to the member and two operating connections to said lever each adapted to provide a lever fulcrum for movement of the valve member by the other, one of said connections being movable independently of the pressure in said chamber, and means through which the other connection is given movements jointly by said elements in response to pressure changes in said chamber and in said chamber space.

27. In control apparatus, the combination of a device adjusted to different positions in accordance with the change in a variable condition, air pressure actuated control means including a chamber, an air actuated fuel or like valve and a connection between said chamber and said valve, a valve mechanism adjustable to regulate the air pressure in said chamber and acting on said means, means through which a movement of said device from one position to another adjusts said valve mechanism to vary said pressure in a direction and to an extent corresponding to the direction and magnitude of said movement, a second air pressure control means actuated by a change in said pressure to vary the latter in the opposite direction and subsequently acting pressure means to vary said pressure in the direction in which it is varied by said mechanism, the last mentioned means including a chamber in restricted communication with the atmosphere.

28. In control apparatus, the combination with a vent nozzle and a valve member angularly adjustable about an axis in fixed relation with said nozzle to thereby variably throttle the discharge through said nozzle, of means coacting to determine the angular adjustment of said member about said axis and comprising a deflecting element adjusted by variations in the magnitude of a variable control quantity, a pressure responsive element adjusted by changes in the pressure in said nozzle, and an element adjustable to adjust the relation of said member and first mentioned element and thereby determine the normal condition which said apparatus tends to maintain, means for adjustment of any one of said three elements, without adjustments of the other two elements, which effects an angular adjustment of said member about said axis.

29. An air control unit comprising a rigid casing part and a flexible wall element connected to said part to form an air chamber between said part and element, means for maintaining a variable air pressure in said chamber comprising a port and a valve member controlling flow through said port, a second flexible wall element connected to the first mentioned element to provide a chamber space between the two elements, said space being in restricted communication with a body of fluid under atmospheric pressure, and the side of said second element remote from said space being exposed to the pressure of the atmosphere, a connection from said second flexible wall element by which movements of the latter moves said valve member toward and away from said port to variably throttle flow through the latter, and a second connection to said valve member movable independently of the first mentioned connection to move said valve toward and away from its seat.

30. In a control system, the combination of a device adjusted to different positions in accordance with changes in a variable controlling condition, a stationary air pressure nozzle, a closure member therefor adjustable to regulate the air pressure in said nozzle, means through which a movement of said device from one position to another adjusts said closure member to vary said pressure in a direction and to an extent depending upon the direction and magnitude of said movement, and mechanism operating independently of the position of said closure member and including an expansible chamber subjected to said pressure and thereby actuated directly by a change in said pressure to effect an adjustment of said closure member in a direction and to an extent partially neutralizing said change, and including means for subsequently eliminating said adjustment.

THOMAS R. HARRISON.
FREDERICK W. SIDE.